US011140829B2

(12) United States Patent
Van Mill et al.

(10) Patent No.: US 11,140,829 B2
(45) Date of Patent: Oct. 12, 2021

(54) FARM IMPLEMENT WITH FOLDING AUGER

(71) Applicant: Unverferth Manufacturing Co., Inc., Kalida, OH (US)

(72) Inventors: Michael D. Van Mill, Shell Rock, IA (US); Ronald J. Schlimgen, Shell Rock, IA (US); Shawn W. Gerdeman, Delphos, OH (US)

(73) Assignee: UNVERFERTH MANUFACTURING CO., INC., Kalida, OH (US)

( * ) Notice: Subject to any disclaimer, the term of this patent is extended or adjusted under 35 U.S.C. 154(b) by 223 days.

(21) Appl. No.: 16/561,894

(22) Filed: Sep. 5, 2019

(65) Prior Publication Data

US 2020/0077593 A1 Mar. 12, 2020

Related U.S. Application Data

(60) Provisional application No. 62/729,575, filed on Sep. 11, 2018.

(51) Int. Cl.
*B60P 1/42* (2006.01)
*A01F 12/46* (2006.01)
*B65G 33/26* (2006.01)

(52) U.S. Cl.
CPC ............... *A01F 12/46* (2013.01); *B60P 1/42* (2013.01); *B65G 33/26* (2013.01)

(58) Field of Classification Search
CPC ...... B65G 33/26; B65G 33/265; B65G 33/30; B65G 65/46; B65G 65/466; B60P 1/40; B60P 1/42; A01F 12/46; A01D 41/1217; A01D 61/008; A01D 90/10
USPC ............................................ 460/114; 414/526
See application file for complete search history.

(56) References Cited

U.S. PATENT DOCUMENTS

| 4,881,855 | A | * | 11/1989 | Rempel | B65G 53/24 |
| | | | | | 406/53 |
| D306,864 | S | * | 3/1990 | Van Mill | D15/27 |
| 4,923,358 | A | * | 5/1990 | Van Mill | B60P 1/42 |
| | | | | | 198/532 |
| 5,409,344 | A | * | 4/1995 | Tharaldson | B60P 1/42 |
| | | | | | 198/314 |
| 6,499,585 | B2 | * | 12/2002 | Mitchell | B65G 19/14 |
| | | | | | 198/550.8 |

(Continued)

*Primary Examiner* — Joseph A Dillon, Jr.
(74) *Attorney, Agent, or Firm* — Rothwell, Figg, Ernst & Manbeck, P.C.

(57) ABSTRACT

A farm implement includes a frame, a container mounted on the frame, a hitch extending away from a front wall of the container in a first direction, and an auger assembly extending away from the front wall. The auger assembly includes a receiving portion coupled to the container, a lower portion coupled to the receiving portion, an upper portion coupled to the lower portion, a joint assembly coupled to both the upper and lower portions, and a discharge portion coupled to the upper portion. The joint assembly allows the upper portion to pivot about a folding axis between a transport position and an operating position. In the operating position, the lower portion is angled toward the hitch relative to a vertical plane extending transverse to a direction of travel by the farm implement, and the lower portion is angularly offset from the upper portion by a second angle.

18 Claims, 9 Drawing Sheets

(56) References Cited

U.S. PATENT DOCUMENTS

| | | | | |
|---|---|---|---|---|
| 7,191,889 B1* | 3/2007 | Heley | | B65G 21/10 198/301 |
| 7,862,260 B2* | 1/2011 | Rempel | | A01D 87/00 406/53 |
| 8,353,644 B2* | 1/2013 | Dunlop | | B60P 1/00 406/64 |
| 8,622,660 B1* | 1/2014 | Gore | | A01K 5/0208 406/41 |
| 8,702,368 B2* | 4/2014 | Van Mill | | B60P 1/42 414/523 |
| 8,911,182 B2* | 12/2014 | Bodie | | A01F 12/46 406/55 |
| 8,919,537 B2* | 12/2014 | Andersson | | B60P 1/38 198/611 |
| 9,039,340 B2* | 5/2015 | Van Mill | | B65G 67/24 414/526 |
| 9,061,834 B2* | 6/2015 | Mulder | | A01F 12/46 |
| 9,102,478 B2* | 8/2015 | Van Mill | | B65G 33/32 |
| 9,199,804 B2* | 12/2015 | Hughes | | B65G 53/4633 |
| 9,205,999 B2* | 12/2015 | Woods | | B65G 53/64 |
| 9,216,681 B1* | 12/2015 | Van Mill | | B60P 1/42 |
| 9,272,653 B2* | 3/2016 | Van Mill | | A01F 12/46 |
| 9,452,891 B2* | 9/2016 | Geraets | | C05F 17/943 |
| 9,555,980 B2* | 1/2017 | Woods | | B65G 53/64 |
| 9,706,713 B2* | 7/2017 | Van Mill | | B60P 1/42 |
| 9,723,789 B2* | 8/2017 | Van Mill | | A01D 90/10 |
| 9,725,025 B2* | 8/2017 | Meier | | B60P 1/42 |
| 9,848,536 B2* | 12/2017 | Van Mill | | A01D 90/10 |
| 10,017,332 B2* | 7/2018 | Carteri | | B65G 53/24 |
| 10,160,367 B2* | 12/2018 | Van Mill | | B60P 1/42 |
| 10,278,328 B2* | 5/2019 | Thomson | | A01D 90/10 |
| 10,377,290 B2* | 8/2019 | Stilborn | | B60P 1/42 |
| 10,390,489 B2* | 8/2019 | Winsnes | | B65G 45/005 |
| 10,426,092 B2* | 10/2019 | Van Mill | | B60P 1/42 |
| 10,448,575 B1* | 10/2019 | Gerdeman | | A01D 90/10 |
| 10,492,368 B2* | 12/2019 | Van Mill | | B60P 1/42 |
| 10,494,203 B2* | 12/2019 | Grenvik | | B65G 33/10 |
| 10,518,980 B2* | 12/2019 | Gerdeman | | B65G 33/14 |
| 10,647,240 B1* | 5/2020 | Grieshop | | B60P 1/42 |
| 10,743,474 B1* | 8/2020 | Schlimgen | | B65G 33/32 |
| 10,807,812 B2* | 10/2020 | Thomson | | A01D 41/1217 |
| 10,874,055 B2* | 12/2020 | Gerdeman | | B60P 1/40 |
| 11,019,771 B2* | 6/2021 | Schlimgen | | A01D 90/10 |
| 2004/0179929 A1* | 9/2004 | Van Mill | | B60P 1/42 414/526 |
| 2004/0184905 A1* | 9/2004 | Kinzenbaw | | B60P 1/40 414/526 |
| 2004/0190366 A1* | 9/2004 | Despres | | B65D 90/587 366/38 |
| 2007/0172338 A1* | 7/2007 | Reimer | | A01F 12/46 414/339 |
| 2009/0123262 A1* | 5/2009 | Van Mill | | B65G 33/32 414/526 |
| 2010/0209223 A1* | 8/2010 | Van Mill | | A01B 73/00 414/526 |
| 2012/0063871 A1* | 3/2012 | Wood | | A01D 90/10 414/523 |
| 2012/0093622 A1* | 4/2012 | Wood | | B60P 1/42 414/523 |
| 2013/0028694 A1* | 1/2013 | Van Mill | | B60P 1/42 414/523 |
| 2013/0259615 A1* | 10/2013 | Van Mill | | B65G 67/24 414/526 |
| 2014/0044511 A1* | 2/2014 | Wood | | B60P 1/42 414/526 |
| 2014/0294548 A1* | 10/2014 | Van Mill | | A01D 90/10 414/523 |
| 2014/0367181 A1* | 12/2014 | Van Mill | | B62D 55/08 180/9.1 |
| 2015/0203019 A1* | 7/2015 | Kinzenbaw | | B65G 67/24 414/526 |
| 2015/0223400 A1* | 8/2015 | Van Mill | | B60P 1/42 414/505 |
| 2015/0237804 A1* | 8/2015 | Van Mill | | B60P 1/42 414/523 |
| 2015/0343934 A1* | 12/2015 | Van Mill | | B65G 67/24 414/523 |
| 2015/0359179 A1* | 12/2015 | Van Mill | | A01B 73/00 414/526 |
| 2016/0165800 A1* | 6/2016 | Van Mill | | A01F 12/46 414/526 |
| 2016/0251167 A1* | 9/2016 | Van Mill | | B65G 43/08 414/21 |
| 2016/0362036 A1* | 12/2016 | Grodecki | | B60P 1/40 |
| 2017/0055454 A1* | 3/2017 | Michael | | B65G 33/32 |
| 2017/0182921 A1* | 6/2017 | Van Mill | | B60P 1/42 |
| 2017/0290270 A1* | 10/2017 | Van Mill | | B65G 41/002 |
| 2018/0027736 A1* | 2/2018 | Van Mill | | A01D 90/10 |
| 2018/0242521 A1* | 8/2018 | Thomson | | A01D 41/1217 |
| 2018/0244477 A1* | 8/2018 | Stilborn | | B65G 41/002 |
| 2018/0303032 A1* | 10/2018 | Loutz | | B65G 41/002 |
| 2019/0059217 A1* | 2/2019 | Matousek | | B65G 11/186 |
| 2019/0218045 A1* | 7/2019 | Thomson | | A01D 41/1217 |
| 2019/0307074 A1* | 10/2019 | Gerdeman | | B60P 1/40 |
| 2019/0337725 A1* | 11/2019 | Gerdeman | | A01D 90/10 |
| 2020/0008356 A1* | 1/2020 | Gerdeman | | A01D 90/10 |
| 2020/0093062 A1* | 3/2020 | Van Mill | | B65G 67/24 |
| 2020/0128736 A1* | 4/2020 | Banks, Jr. | | B65G 33/32 |
| 2020/0154641 A1* | 5/2020 | Van Mill | | B60P 1/40 |
| 2020/0238882 A1* | 7/2020 | Grieshop | | B60P 1/42 |
| 2020/0323136 A1* | 10/2020 | Brandmeier | | A01D 61/00 |
| 2020/0359566 A1* | 11/2020 | Schlimgen | | B65G 33/14 |
| 2020/0367436 A1* | 11/2020 | Schlimgen | | B65G 33/14 |
| 2021/0107575 A1* | 4/2021 | Van Mill | | B62D 55/14 |

* cited by examiner

FARM IMPLEMENT WITH FOLDING AUGER

CROSS-REFERENCE TO RELATED APPLICATION

This application claims the benefit of U.S. Provisional Application Ser. No. 62/729,575, filed on Sep. 11, 2018, the entire disclosure of which is incorporated by reference herein in its entirety.

FIELD OF INVENTION

The present disclosure relates generally to farm implements and, more particularly, to farm implements having folding augers.

BACKGROUND

In agriculture, augers are frequently used to move material from a cart to another cart, silo, truck, or other storage facility. Augers used to move grain are known as grain augers and are frequently employed in farm implements. A typical grain auger includes an auger screw of constant diameter and pitch that is housed inside a tubular housing or shaft to form an auger assembly. An intake portion of the auger assembly can draw from a hopper (usually by gravity) attached to it to receive grain or other material from the hopper and the other end (i.e., the discharge end) has a chute or the like to guide the grain or other material into its destination. It is well known in the art to attach an auger assembly to a farm implement to off-load the farm implement.

As a farm implement with a fully extended auger can be somewhat unwieldy during transport, many farm implements employ folding augers that can open to an operating position and fold to a transport position. In general, a typical folding auger assembly includes a lower auger assembly and an upper auger assembly. When in the operating position, the upper and lower auger assemblies function as one co-linear auger. When in the transport position, the upper auger portion folds to reduce the height and the width of the farm implement. Folding the auger assembly makes it easier to transport the farm implement on roads.

However, typical folding augers have distinct disadvantages. For instance, typical folding augers fail to maximize side and forward reach when in an operating position and minimize transport size when in a transport position. Another disadvantage of typical folding augers is that the folding motion may not clear the cab of some tractors, making it difficult to convert the auger between operating and transport positions. An additional disadvantage with typical folding augers is the limited visibility of the discharge operation from the viewpoint of an operator in a tractor towing the grain cart due to the limited forward reach of existing folding augers.

SUMMARY OF THE INVENTION

Accordingly, there is a need to provide an improved auger assembly for a farm implement that maximizes side and forward reach of the auger assembly when in an operating position and minimizes transport size of the auger assembly when in a transport position. Furthermore, there is a need to provide an improved auger assembly for a farm implement that provides the operator improved visibility of the discharge end of the auger assembly.

According to a first aspect, embodiments of a farm implement are provided. In an embodiment, the farm implement may comprise a frame, a container mounted on the frame and comprising a front wall, a rear wall, and laterally opposed side walls such that the container defines a space for holding grain, a hitch extending in a first direction from the front wall, and an auger assembly extending away from the front wall and configured to receive grain held in the container and convey the grain out of the container. In an embodiment, the auger assembly may comprise a receiving auger portion disposed proximate to the front wall, a lower auger portion comprising a lower auger housing extending along a longitudinal axis of the lower auger portion from a first end to a second end, wherein the first end of the lower auger housing is operatively connected to the receiving auger portion, an upper auger portion comprising an upper auger housing extending along a longitudinal axis of the upper auger portion from a first end to a second end, a joint assembly coupled to the upper and lower auger portions and defining a folding axis, wherein the upper auger portion is configured to pivot about the folding axis between a transport position and an operating position such that the first end of the upper auger housing abuts the second end of the lower auger housing in the operating position, and the first end of the upper auger housing is spatially separated from the second end of the lower auger housing in the transport position, and a discharge spout coupled to the second end of the upper auger housing. In an embodiment, the lower auger portion is angled toward the hitch relative to a vertical plane extending transverse to a direction of travel by the farm implement such that a centerline of the lower auger portion is oriented at a first angle relative to the vertical plane. In an embodiment, the lower auger portion is angularly offset from the upper auger portion such that the centerline of the lower auger portion is oriented at a second angle relative to a centerline of the upper auger portion. In some embodiments, the second angle corresponds to a forward component of the angular offset between the upper and lower auger portions such that an angular displacement between the upper and the lower auger portions, as defined by the second angle, extends in the first direction toward the hitch.

In some embodiments, the first angle may range from about 5° to about 25°. In one embodiment, the first angle may be set at about 12°. In some embodiments, the second angle may range from about 10° to about 30°. In one embodiment, the second angle may be set at about 17.5°. In some embodiments, the auger receiving portion may be disposed at about a center position along a bottom edge of the front wall. In some embodiments, the vertical axis may extend through the pivot member. In some embodiments, the upper auger housing may extend along the front wall in a lateral direction when the upper auger portion is set in the transport position. In some embodiments, the upper auger housing may extend along one of the side walls when the upper auger portion is set in the transport position. In some embodiments, the centerline of the lower auger portion may be defined by the longitudinal axis of lower auger portion or may be parallel to the longitudinal axis of the lower auger portion, and the centerline of the upper auger portion may be defined by the longitudinal axis of upper auger portion or may be parallel to the longitudinal axis of the upper auger portion.

In some embodiments, the hitch may comprise a tongue and a coupler disposed at an end thereof, and when the upper auger portion is set in the operating position, the auger assembly extends beyond the hitch in the first direction such that the discharge portion is disposed ahead of the tongue and the coupler by a first predetermined distance. In some embodiments, the first predetermined distance may be set from about 8 inches to 24 inches. In some embodiments, the first predetermined distance may be set at 19¾ inches. In some embodiments, the auger receiving portion is aligned with the coupler of the hitch.

In some embodiments, auger assembly may further comprise a pivot member integrated with the lower auger portion, and the pivot member is configured to rotate about a rotational axis extending transverse to the vertical axis such that the auger assembly pivots between a plurality of operating positions. In some embodiments, a height between the discharge portion and a ground surface changes as the auger assembly pivots between the plurality of operating positions. In some embodiments, the height between the discharge portion and the ground surface may range from about 10 feet to 20 feet. In some embodiments, a side reach between the discharge portion and the rotational axis changes as the auger assembly pivots between the plurality of operating positions. In some embodiments, the side reach between the discharge portion and the rotation axis may range from about 11 feet to about 17 feet.

Advantages of the embodiments of the present disclosure include increased forward and side reach of the auger assembly while allowing the auger assembly to maintain a compact transport position, and additional storage capacity of the hopper.

Other advantages of the present disclosure will be apparent to those skilled in the art upon reviewing the detailed description of the embodiments and the accompanying drawings.

BRIEF DESCRIPTION OF THE DRAWINGS

The accompanying drawings, which are incorporated herein and form part of the specification, illustrate various embodiments of the present disclosure and, together with the description, further serve to explain the principles of the invention and to enable those skilled in the art to make and use the invention. In the drawings, like reference numbers indicate identical or functionally similar elements.

DETAILED DESCRIPTION OF EXEMPLARY EMBODIMENTS OF THE INVENTION

While the present invention may be embodied in many different forms, a number of illustrative embodiments are described herein with the understanding that the present disclosure is to be considered as providing examples of the principles of the invention and such examples are not intended to limit the invention to those embodiments described herein and/or illustrated herein.

Figure 1:
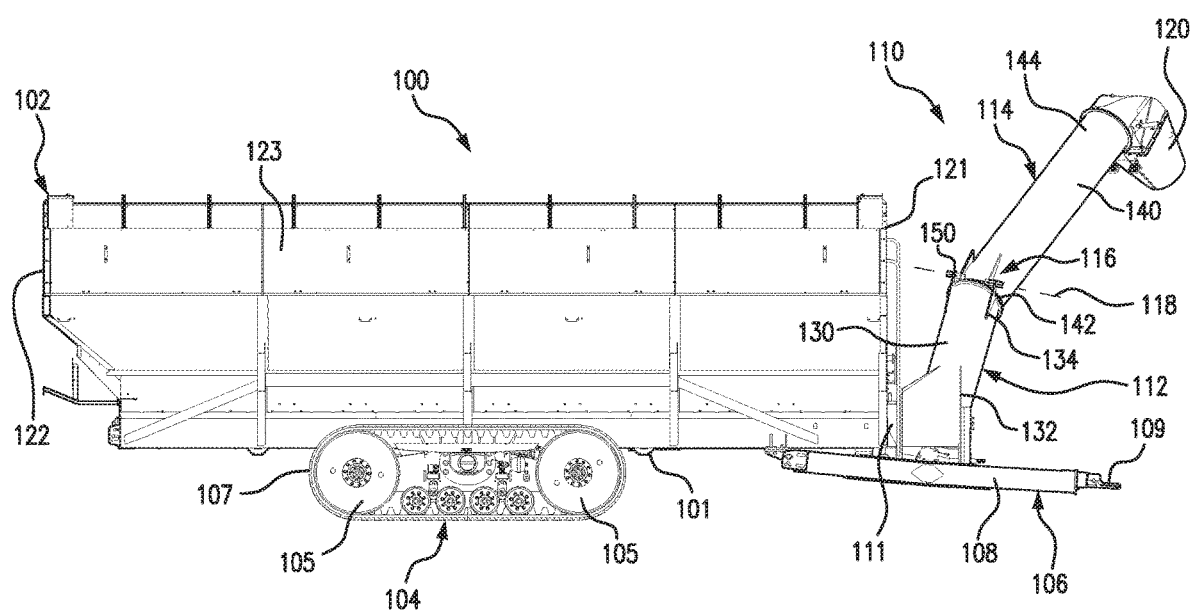
FIG. 1 depicts a side view of a farm implement according to an embodiment.

Referring to FIGS. 1-8, a non-limiting embodiment of a farm implement, as disclosed herein, is indicated by reference number 100 and comprises a frame 101, a grain holding container or hopper 102, and a front-folding auger assembly 110 configured to receive grain held in the hopper 102 and convey the grain out of the hopper 102. FIG. 1 is a side view of the farm implement 100 with the auger assembly 110 set in an operating position. The grain holding container or hopper 102 is mounted on the frame 101 with a track assembly 104 and a hitch 106. In the illustrated embodiment, the track assembly 104 includes front and rear idler wheels 105 and a track belt 107 looped around the front and rear idler wheels 105 to make contact with a ground surface. The track assembly 104 is configured to allow the farm implement 100 to move along the ground in a direction of travel. In other embodiments, the frame 101 may be mounted to wheels, without a track assembly, for moving the farm implement 100. As shown in FIG. 1, the hitch 106 comprises a tongue 108 that extends from a front end of the hopper 102 in a first direction and a coupler 109 disposed at an end thereof for connecting to other vehicles, such as a tractor which may be used to tow the farm implement 100. In some embodiments, the first direction corresponds to the direction of travel by the farm implement.

Figure 2:
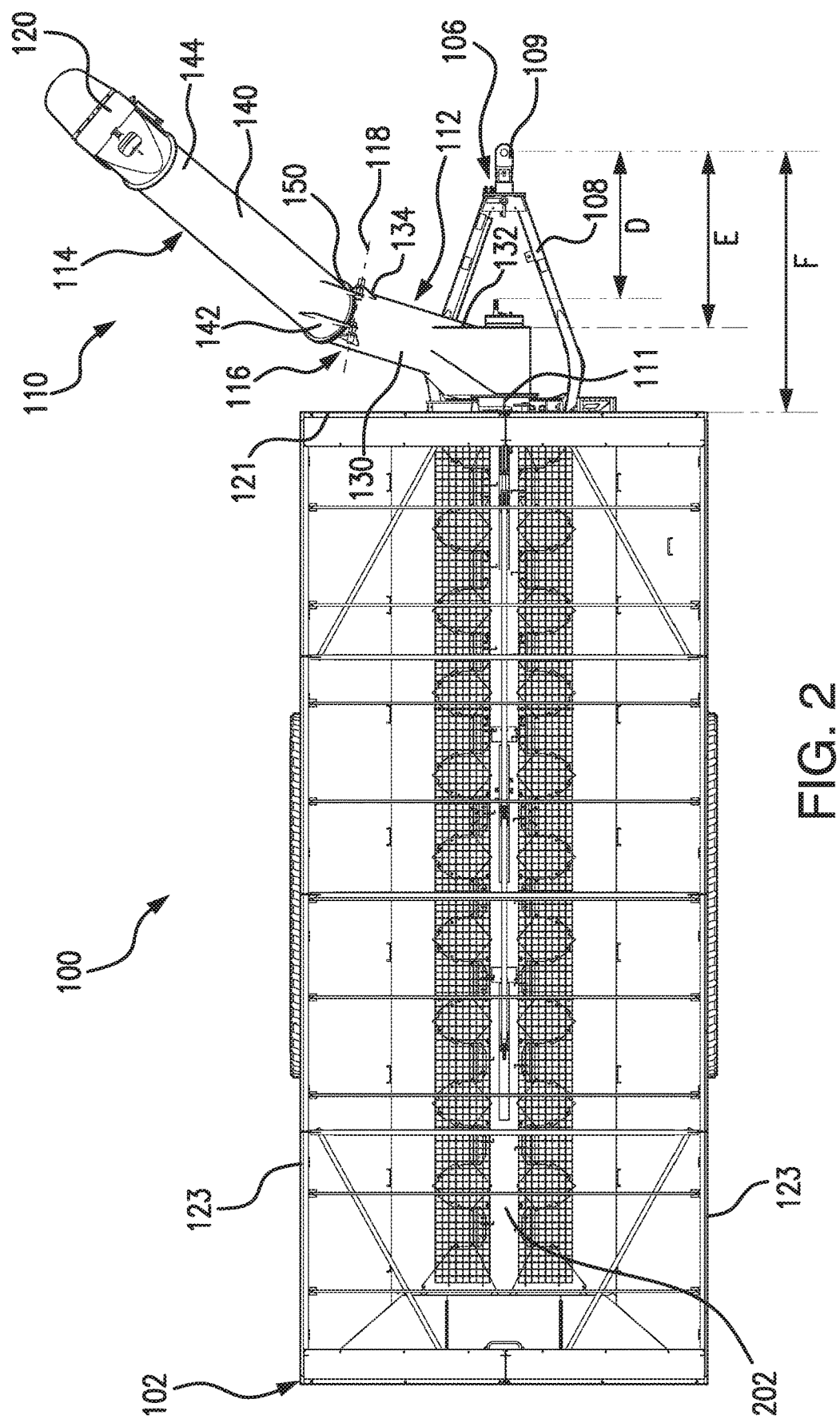
FIG. 2 depicts a top view of a farm implement according to an embodiment.

The hopper 102 comprises a front wall 121, a rear wall 122, and laterally opposed side walls 123, which together define a grain holding space with an open top and a bottom. The auger assembly 110 comprises an intake or receiving portion 111 configured to receive grain from the hopper 102. In embodiments, the intake or receiving portion 111 of the auger assembly 110 is positioned in a sump proximate the base or bottom of the hopper 102 to draw grain from the bottom of the hopper into the auger assembly 110. Referring to FIG. 2, in embodiments, the intake or receiving portion 111 of the auger assembly 110 is fed by a generally horizontal auger 202 that extends along the bottom of the hopper 102. As shown in FIG. 2, the intake or receiving portion 111 of the auger assembly 110 is disposed proximately at the center of the front wall 121 of the hopper 102 and aligned with the coupler 109 of the hitch 106 and the horizontal auger 202.

The auger assembly 110 comprises a lower auger portion 112, an upper auger portion 114, a joint assembly 116 coupled to the upper and lower auger portions 112, 114, and a discharge portion 120 coupled to an end of the upper auger portion 114. Referring to FIG. 1, the lower auger portion 112 comprises a lower auger housing 130 extending along a longitudinal axis of the lower auger portion from a first end 132 to a second end 134, wherein the first end 132 of the lower auger housing 130 is operatively connected to the receiving auger portion 111. In one non-limiting embodiment, the lower auger portion 112 comprises a lower auger shaft (not shown) configured to rotate about the longitudinal axis of the lower auger portion 112 and a helical flight array disposed along and projecting from the lower auger shaft in a radial direction. The upper auger portion 114 comprises an upper auger housing 140 extending along a longitudinal axis of the upper auger portion 114 from a first end 142 to a second end 144. In one non-limiting embodiment, the upper auger portion 114 comprises a lower auger shaft (not shown) configured to rotate about the longitudinal axis of the upper auger portion 114 and a helical flight array disposed along and projecting from the upper auger shaft in a radial direction. The discharge portion 120 comprises a spout coupled to the second end 144 of the upper auger housing 140.

The upper auger portion 114 is connected to the lower auger portion 112 by the joint assembly 116, which defines a folding axis 118 and allows the upper auger portion 114 to be moved (e.g., pivoted, rotated, folded) about the folding axis 118 between an operating position, in which the upper auger portion 114 extends laterally and forwardly outward from the front wall 121 of the hopper 102, and a transport position, in which the upper auger portion 114 is folded across the front wall 121 of the hopper 102. Accordingly, when the upper auger portion 114 is set in the operating position, the auger assembly 110 extends away from the front wall 121 and upwardly from the auger receiving portion 111 such that the discharge portion 120 is laterally and forwardly spaced from the hopper 102 to facilitate discharge of grain from the auger assembly into another container such as, for instance, another farm implement, semi-trailer, or rail car located to the side of the farm implement 100. As will be described in more detail with respect to FIG. 4, the lower auger portion 112 is angled with respect to the front wall 121 of the hopper 102, and the lower auger portion 112 is angularly offset with the upper auger portion 114.

FIG. 2 is a top view of farm implement 100 as shown in FIG. 1. A side reach of the auger assembly 110 is apparent from FIG. 2. The angles between the lower auger portion 112 and the front wall 121 of the hopper 102, and between the upper auger portion 114 and the lower auger portion 112, are also apparent from FIG. 2.

Figure 3:
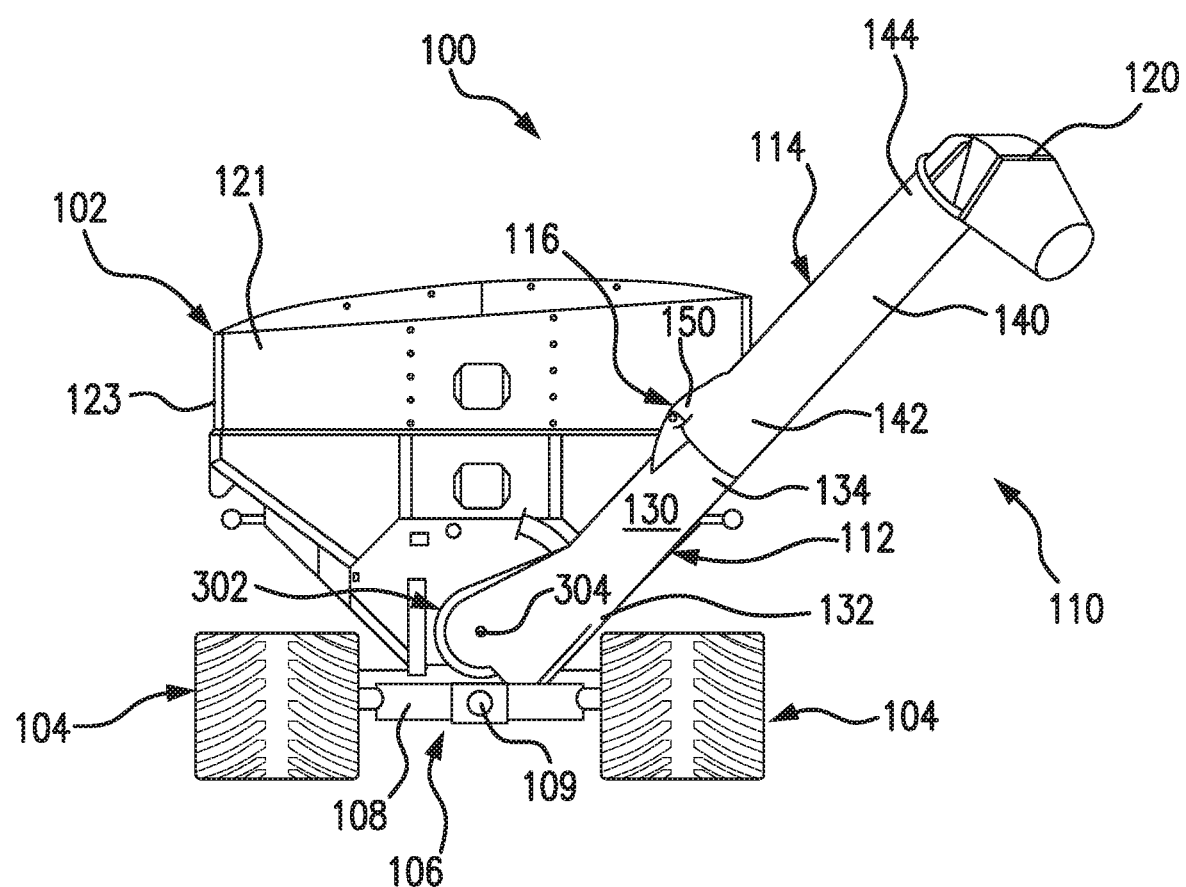
FIG. 3 depicts a front view of a farm implement according to an embodiment.
Figure 5A:
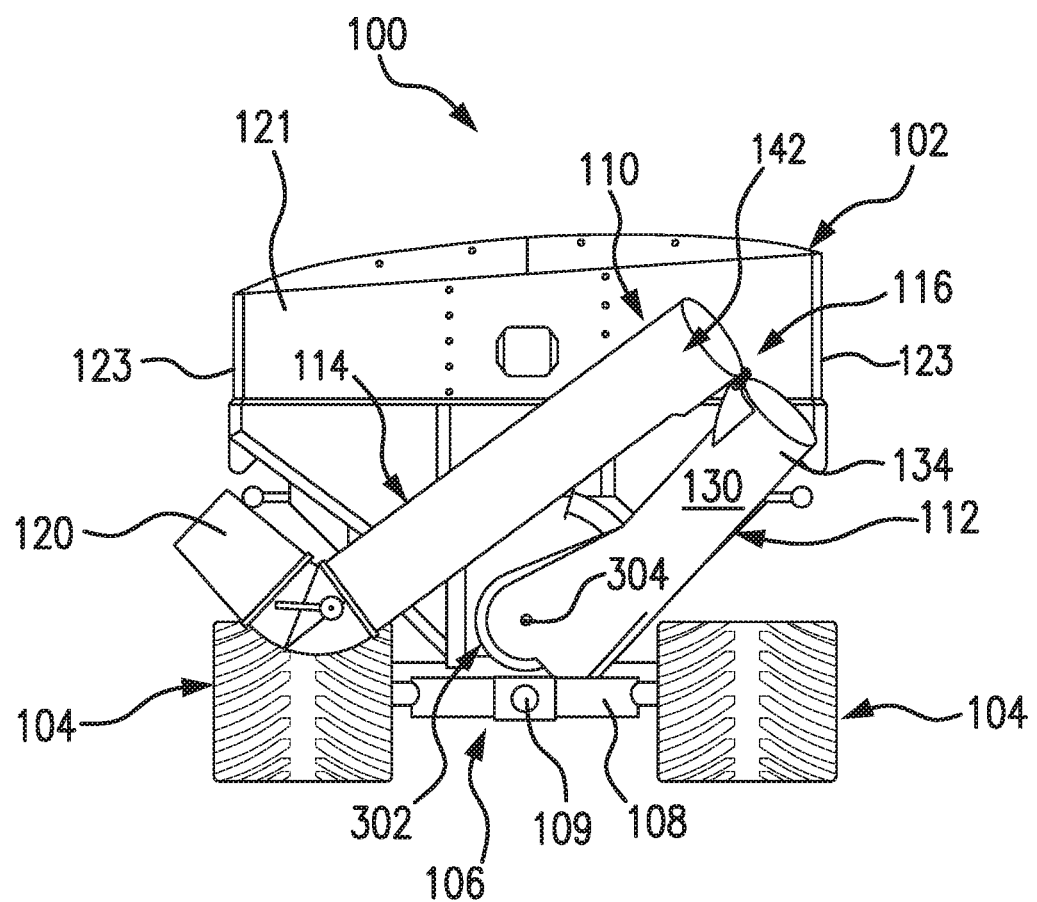
FIGS. 5A and 5B depict a view of a farm implement according to an embodiment showing folded position of auger according to an embodiment.
Figure 5B:
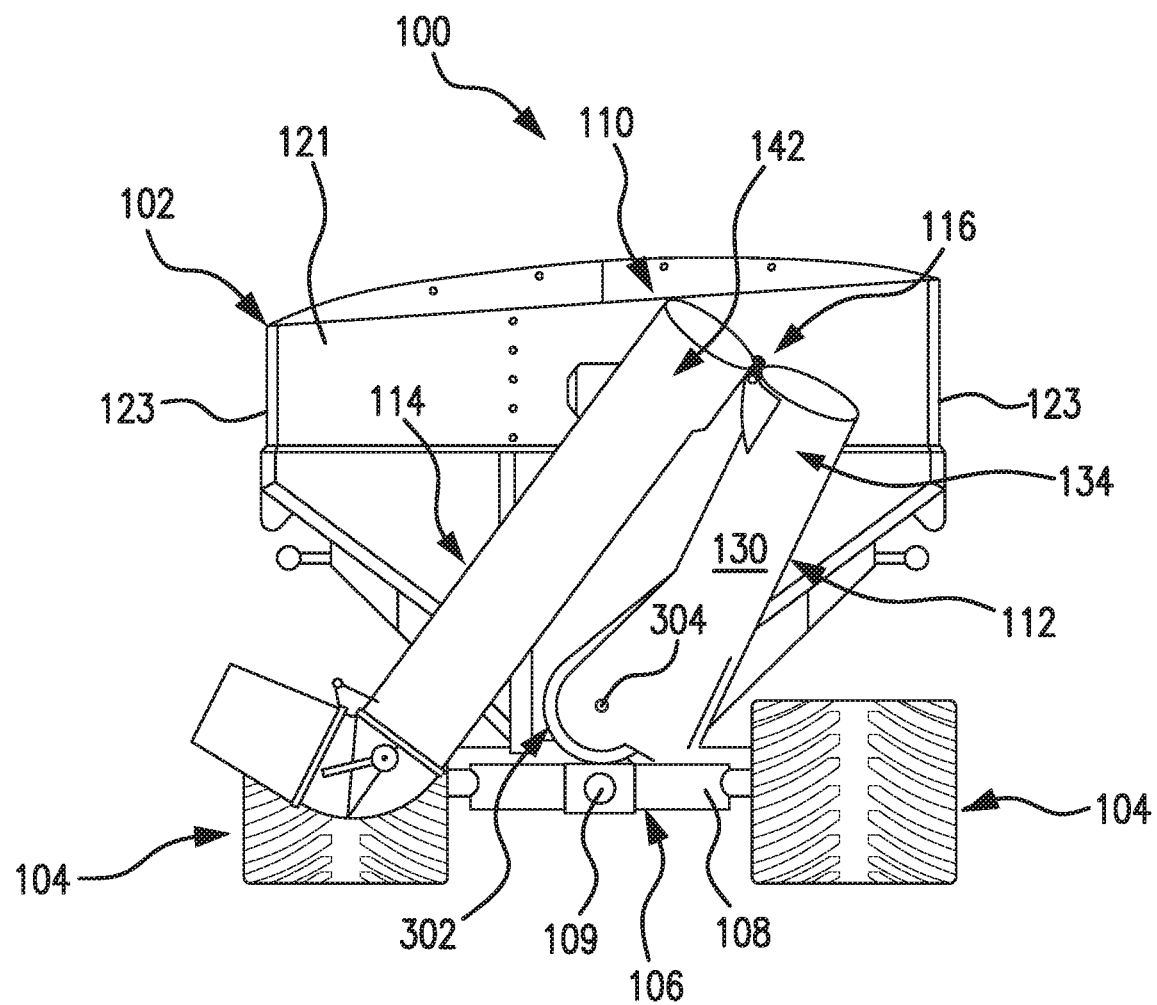

In accordance with a non-limiting embodiment, the joint assembly 116 may include a hinge pin 150. The hinge pin 150 is oriented to cause the upper auger portion 114 to fold in the manner described. In other words, the hinge pin 150 defines the folding axis 118 about which the upper auger portion 114 may be folded. The hinge pin 150 may be oriented such that the upper auger portion 114 and the lower auger portion 112 can be rotated about one another. The joint assembly 116 may comprise a hydraulic actuator (not shown) operatively connected to the upper auger portion 114 and the lower auger portion 112. The hydraulic actuator is configured to expand and retract to move or pivot the upper auger portion 114 between the transport and operating positions. Referring to FIG. 3, when the upper auger portion 114 is set in the operating position, the first end 142 of the upper auger housing 140 abuts the second end 134 of the lower auger housing 130 such that grain may be conveyed from the lower auger portion 112 to the upper auger portion 114. Referring to FIGS. 5A and 5B, when the upper auger portion 114 is set in the transport position, the first end 142 of the upper auger housing 140 is spatially separated from the second end 134 of the lower auger housing 130, whereby the upper auger housing 140 is oriented along the front wall 121. In other embodiments (not shown), the upper auger portion 114 may pivot about the folding axis 118 in a different direction such that the upper housing 140 extends along one of the sidewalls 123 when set in the transport position.

Figure 6:
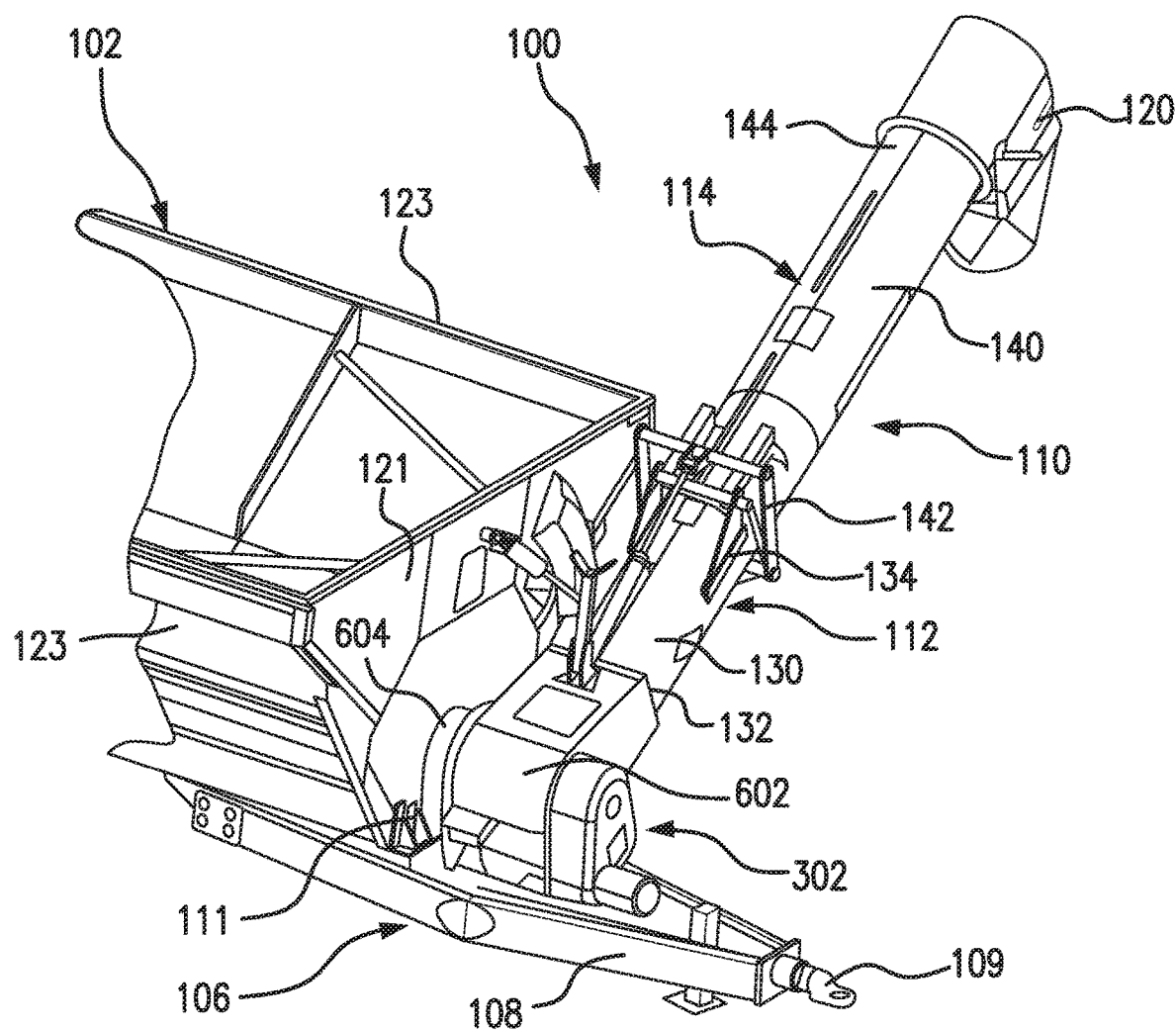
FIG. 6 depicts a perspective view of a pivoting member integrated with the auger assembly and a hopper of the farm implement according to an embodiment.
Figure 7:
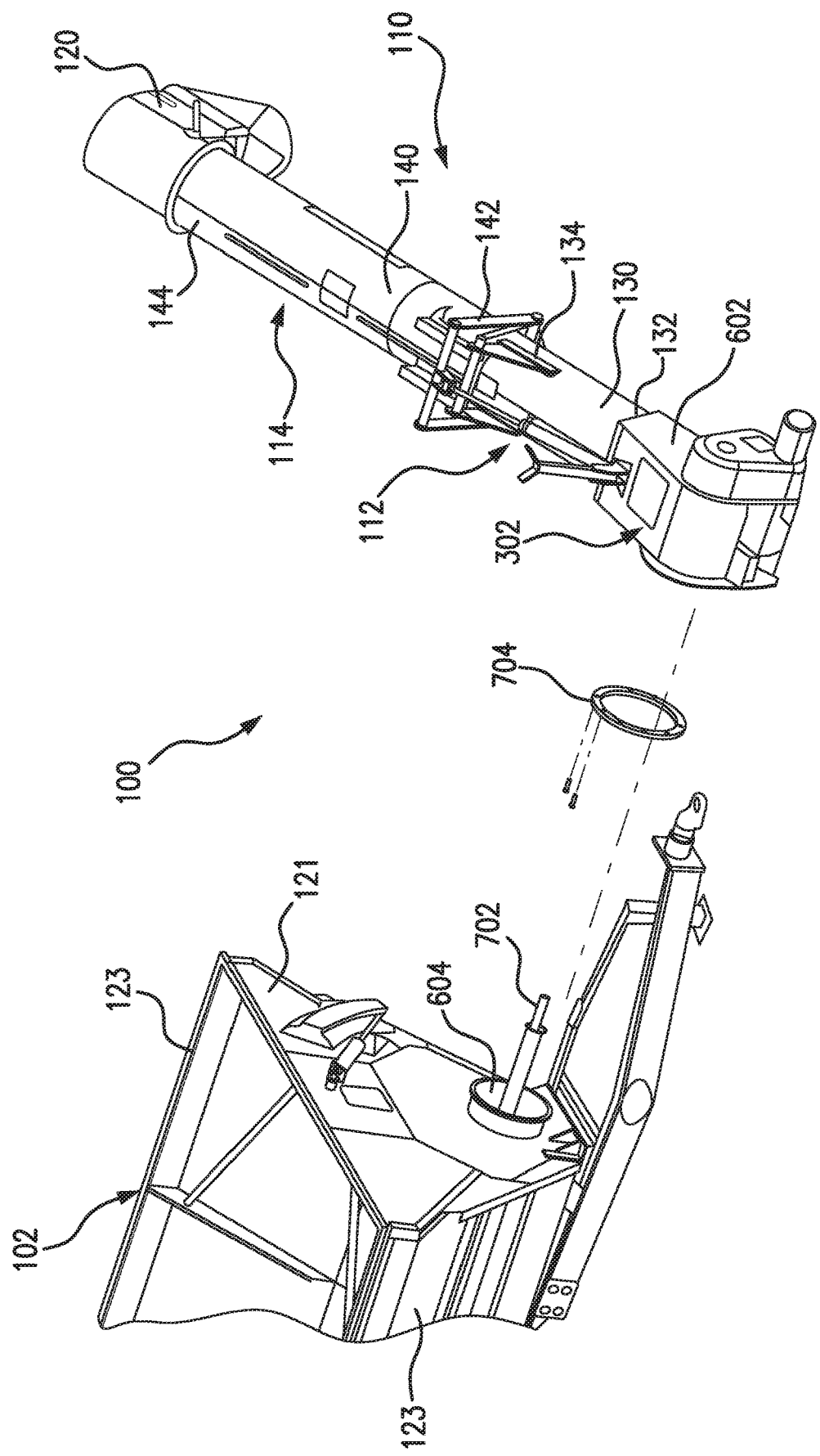
FIG. 7 depicts a side exploded view of a pivoting member integrated with the auger assembly and a hopper of the farm implement according to an embodiment.
Figure 8:
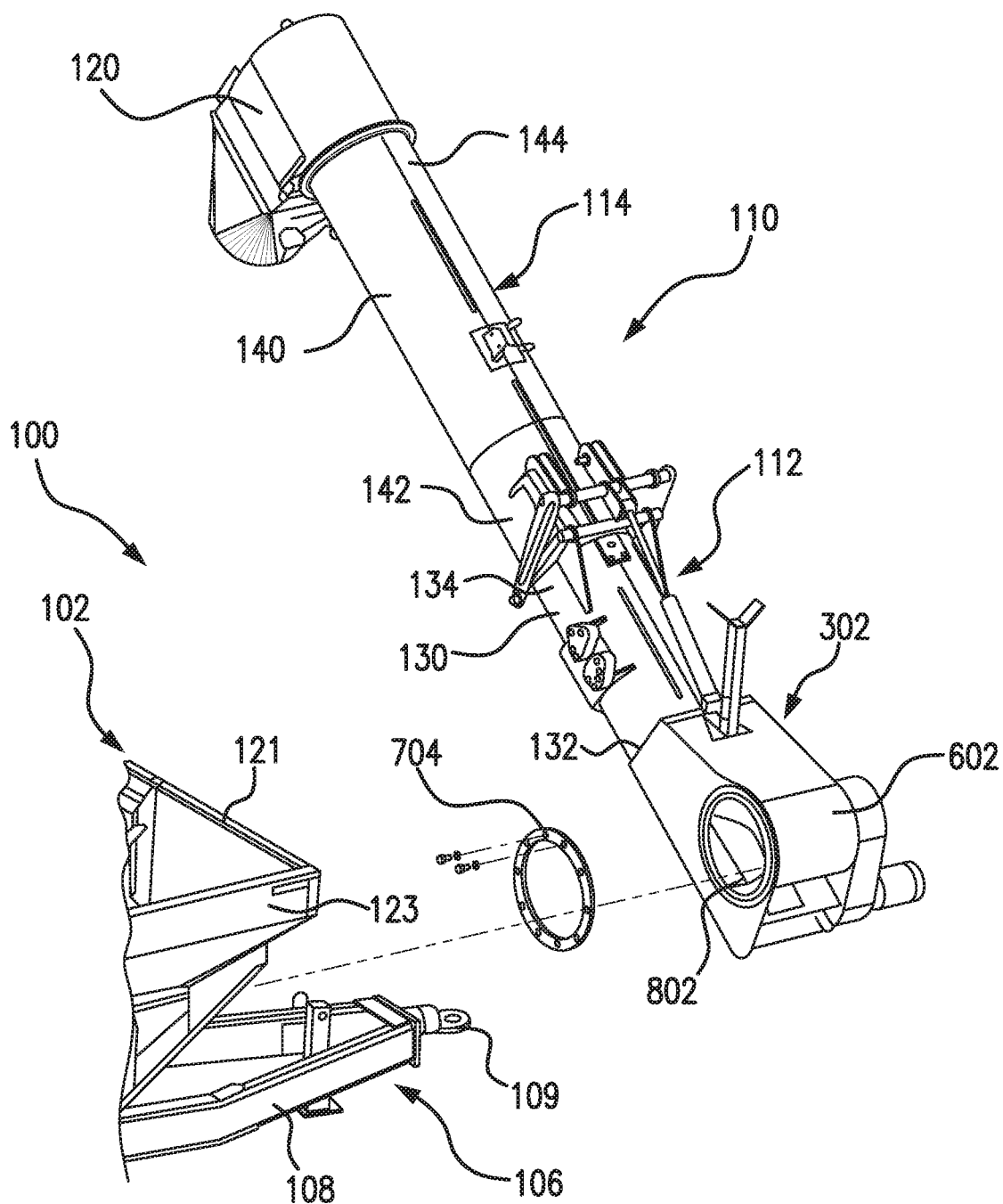
FIG. 8 depicts a rear exploded view of a pivoting member integrated with the auger assembly and a hopper of the farm implement according to an embodiment.

FIG. 3 is a front view of farm implement 100 as shown in FIGS. 1 and 2. The auger assembly 110 comprises a pivoting member 302 integrated with the lower auger portion 112 and coupled to the front wall 121 of the hopper 102. Referring to FIGS. 6-8, in one non-limiting embodiment, the pivoting member 302 comprising a housing 602 connected to the first end 132 of the lower auger housing 130 and provides a hollow extension of the auger assembly 110. As shown in FIG. 6, the housing 602 of the pivoting member 302 is configured to rotatably connect with a housing extension 604 of the horizontal auger 202 (see FIG. 1 for horizontal auger 202) so that grain may flow from the horizontal auger 202 to the lower auger portion 112. Referring to FIG. 7, the horizontal auger 202 (see FIG. 1) comprises a shaft 702 configured to rotate about a longitudinal axis of the horizontal auger 202 (see FIG. 1). In one non-limiting embodiment, the rotational axis of the pivot member 302 is defined by the shaft 702 of the horizontal auger 202 (see FIG. 1). Referring to FIG. 8, the pivoting member 302 may include a circular-shaped outer pivot flange 802 projected from a side of the housing 602 and configured to rotatably mate with a housing extension 604 (see FIG. 6) of the horizontal auger 202 (see FIG. 1). As shown in FIGS. 7 and 8, in some embodiments, the pivoting member 302 includes a retaining ring segments 704 interposed between the outer pivot flange 802 and the housing extension 604 of the horizontal auger 202 (see FIG. 1), such that the pivoting member 302 rotates on the housing extension 604 via the retaining ring segments 704.

Referring to FIG. 3, in one embodiment, when the upper auger portion 114 is set in the operating position, the pivoting member 302 is configured to rotate on the housing extension of the horizontal auger 202 about an axis defined by a shaft 304 of the horizontal auger 202. By rotating about the axis defined by shaft 304, the pivoting member 302 allows the auger assembly 110 to pivot between a plurality of operating positions, thereby adjusting the side reach and the discharge height of the discharge portion 120 to accommodate trailers of various heights. For example, as shown in FIG. 3, a height between the discharge spout and a ground surface changes as the auger assembly 110 pivots between the plurality of operating positions. Additionally, a lateral distance between the discharge portion 120 and the rotational axis changes as the auger assembly 100 pivots between the plurality of operating positions. In one embodiment, the "side reach" may be measured by a distance from the rotational axis or approximate center of the farm implement to the discharge portion 120, as labeled "C" in FIG. 3. In some embodiments, the side reach of the auger assembly 110 may range from about 5 feet to 20 feet. In some embodiments, the side reach of the auger assembly 110 may range to about 14 feet, 5 inches. Ultimately, the ability to adjust the side reach and the discharge height of the auger assembly 100 provides the operator some latitude in positioning the grain cart alongside a trailer.

As shown in FIGS. 5A and 5B, when the upper auger portion 114 is set in the transport positions, the pivot member 302 may rotate about the axis defined by shaft 304 such that the auger assembly 110 may pivot between a plurality of transport positions. Referring to FIG. 5A, in one transport position, the lower auger portion 112 is angled toward the sidewall 123 of the hopper 102. Referring to FIG. 5B, in another transport position, the lower auger portion 112 is angled toward the top of the front wall 121 of the hopper 102, such that the lower auger portion 112 is disposed further away from the sidewall 123 of the hopper 102. Accordingly, the transport size of the auger assembly 110 may be adjusted by pivoting the auger assembly 110 between the plurality of transport positions.

In some embodiments, dimensions of the hitch 106 and the pivot member 302 may be modified to ensure that the rear tires of a vehicle (e.g., tractor, not shown) towing the implement 100 clear the housing 130 of the lower auger portion 112 and the housing 602 of the pivot member 302 when the vehicle is making a turn. For example, as shown in FIG. 2, a distance between the coupler 109 and a gearbox input shaft of the auger assembly 100 is indicated by "D." In some embodiments, the distance between the coupler 109 and a gearbox input shaft of the auger assembly 100 may range from 55 to 65 inches, in one embodiment about 60.5 inches. By setting the distance "D" to about 60.5 inches, a single shaft driveline assembly may be used between the power-takeoff of the vehicle and input shaft of the auger assembly 100, whereas conventional implements require multiple shaft drive lines due to longer distances between the coupler of the hitch and the input shaft of the auger assembly. Referring to FIG. 2, a distance between the coupler 109 and a front face of the pivot member 302 is indicated by "E." In some embodiments, the distance between the coupler 109 and the front face of the pivot member 302 may range from 70 to 80 inches, in one embodiment about 74.5 inches. Referring to FIG. 2, a distance between the coupler 109 and the front wall 121 of the hopper 102 is indicated by "F." In some embodiments, the distance between the coupler 109 and the front wall 121 may range from 100 to 110 inches, in one embodiment about 106 inches. In some embodiments, distances "D," "E," and "F" shown in FIG. 2 are determined by turning clearances of the rears tires of the vehicle pulling the implement 100.

In non-limiting embodiments, the auger assembly 110 comprises an auger shaft coupling assembly (not shown) disposed between an end of the lower auger shaft and an end of the upper auger shaft. The auger shaft coupling assembly is configured to releasably connect the end of the lower auger shaft to the end of the upper auger shaft when the upper auger portion 114 is set in the operating position. When the upper auger portion 114 is set in the operating position and the end of the lower auger shaft is operatively connected to the first end of the upper auger shaft, the auger shaft coupling assembly is configured to transmit torque applied from the lower auger shaft to the upper auger shaft such that the lower auger shaft and the upper auger shaft rotate to convey grain from the receiving portion 111 to the discharge portion 120 of the auger assembly 110.

In non-limiting embodiments, the auger shaft coupling assembly (not shown) may comprise a lower auger coupling portion, an upper auger coupling portion, a joint, a bearing hanger, support legs, and a drive pin. An exemplary embodiment of the auger shaft coupling assembly is described in U.S. patent application Ser. No. 15/971,921, filed May 4, 2018, entitled "AUGER COUPLING ASSEMBLY WITH A PIVOTABLE CLUTCH," the contents of which are hereby incorporated by reference. In one embodiment, the lower auger coupling portion (not shown) is disposed at the end of the lower auger shaft and is connected to the lower auger shaft by the joint. The upper auger coupling portion (not shown) is disposed at the end of the upper auger shaft and is configured to releasably connect to the lower auger coupling portion when the upper auger portion 114 is in the operating position. In one embodiment, the drive pin is secured to the upper auger coupling portion such that the drive pin is disposed along an edge of the upper auger coupling portion and the lower auger coupling portion when the upper auger portion 114 is set in the operating position.

In non-limiting embodiments, the bearing hanger (not shown) circumscribes a lower end of the lower auger coupling portion. Each support leg (not shown) comprises a proximal end connected to the bearing hanger and a distal end connected to the housing of the lower auger portion such that the bearing hanger and the support legs hold the lower auger shaft and the lower auger coupling portion in a desired orientation relative to lower auger housing. In non-limiting embodiments, the bearing hanger and support legs hold the lower auger coupling portion and the lower auger shaft at angular offset position relative to the upper auger coupling portion and the upper auger shaft when the upper auger portion 114 is set at the operating position.

In non-limiting embodiments, the joint (not shown) comprises a drive configured to transmit rotation forces from the lower auger shaft to the upper auger shaft. According to some embodiments of the present disclosure, the joint connecting the lower auger coupling portion to lower auger shaft is a universal joint (also known as a universal coupling, a U-joint, a Cardan joint, a Hardy-Spicer joint, or a Hooke's joint). However, any joint that allows the transfer of rotational motion through an angle would be acceptable.

Figure 4:
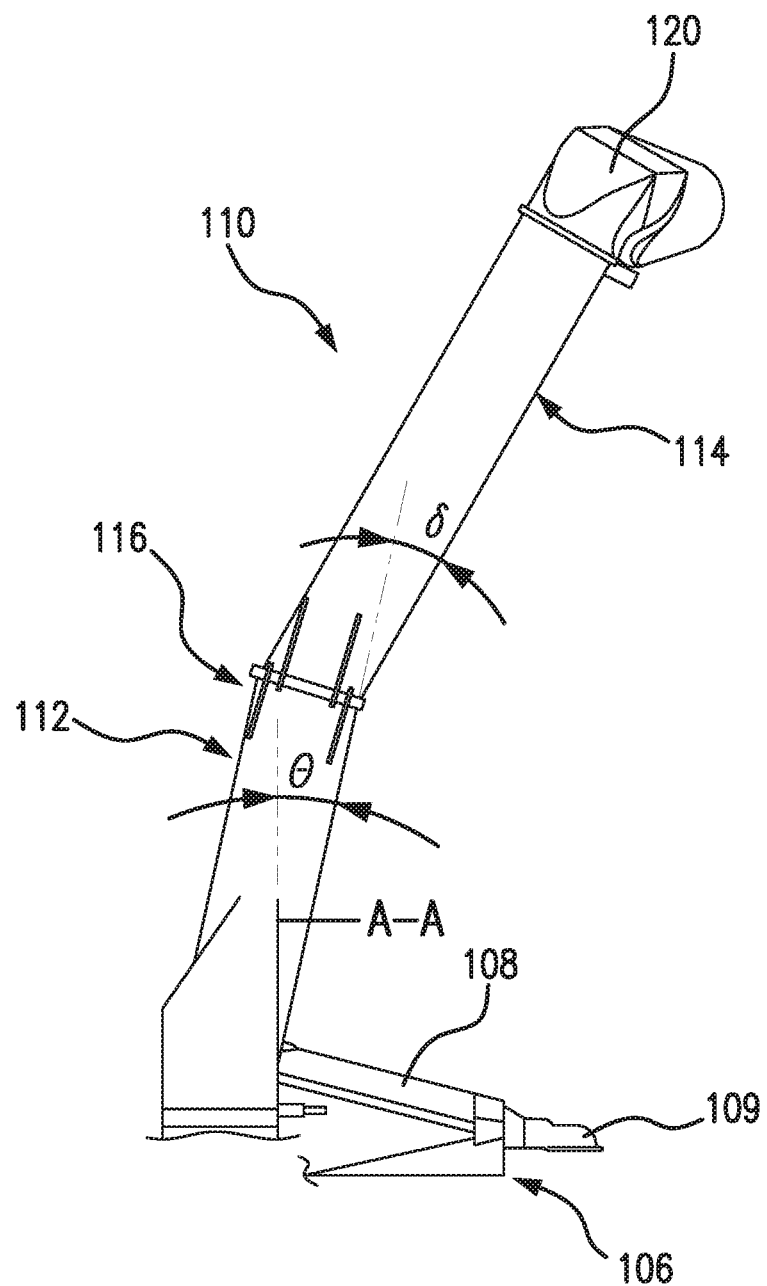
FIG. 4 depicts a view of an auger assembly according to an embodiment.

FIG. 4 is a view of auger assembly 110 from a plane defined by a centerline of lower auger power 112 and a centerline of the upper auger portion 114 which intersect at a point. As shown in FIG. 4, when the auger assembly 110 is set in the operating position, the lower auger portion 112 is angled toward the hitch 106 relative to a vertical plane A-A extending transverse to the direction of travel by the farm implement such that the centerline of the lower auger portion 112 is oriented at a first angle $\theta$ relative to the vertical plane A-A. In the illustrative embodiment, the vertical plane A-A is oriented orthogonal to the plane of view of FIG. 4. In some embodiments, the vertical plane A-A extends parallel to at least a vertical portion of the front wall 121 and extends through the pivoting member 302. The angular displacement between the lower auger portion 112 and the vertical plane A-A, as defined by the first angle $\theta$, extends in the direction of travel by the farm implement. Accordingly, increasing the magnitude of the first angle $\theta$ extends the forward reach of the auger assembly 110 in the direction of travel (e.g., the first direction toward the hitch). In some embodiments, the centerline of the lower auger portion 112 is defined by the longitudinal axis of the lower auger portion 112 or by a line extending parallel to the longitudinal axis of the lower auger portion 112. In some embodiments, the first angle $\theta$ may range from about 10° to about 30°. In the non-limiting illustrated embodiment, the first angle $\theta$ is set at approximately 12°, within a few degree degrees in either direction.

As shown in FIG. 4, the upper auger portion 114 is angularly offset from lower auger portion 112 such that the centerline of the lower auger portion 112 is oriented at a second angle $\delta$ relative to the centerline of the upper auger portion 114. As shown in FIG. 4, in the context of the present disclosure, the second angle $\delta$ is measured from the centerline of lower auger portion 112 to the centerline of upper auger portion 114. In some embodiments, the angular offset between the upper auger portion 114 and the lower auger portion 112 can be viewed as having three different components including a forward component, a lateral component, and a vertical component. In the context of the present disclosure, the forward component of the angular offset refers to the displacement of the upper auger portion 114 from the lower auger portion 112 in the first direction extending toward the hitch 106. In the context of the present disclosure, the lateral component of the angular offset refers to the displacement of the upper auger portion 114 from the lower auger portion 112 in a lateral direction extending transverse to the first direction. In the context of the present disclosure, the vertical component refers to the displacement of the upper auger portion 114 from the lower auger portion 112 in a vertical direction extending transverse to the first direction and the lateral direction. Referring to FIG. 4, the second angle $\delta$ corresponds to the forward component of the angular offset between the upper and lower auger portions 112, 114 such that the angular displacement between the upper auger portion 114 and the lower auger portion 112, as defined by the second angle δ, extends in the first direction toward the hitch 106. Accordingly, increasing the magnitude of the second angle δ extends the forward reach of the auger assembly 110 in the first direction toward the hitch. In some embodiments, the centerline of the upper auger portion 114 is defined by the longitudinal axis of the upper auger portion 114 or by a line extending parallel to the longitudinal axis of the upper auger portion 114. In some embodiments, the second angle δ may range from about 10° to about 30°. In the non-limiting illustrative embodiment, the second angle δ is set at approximately 17.5°, within a few degrees in either direction.

The orientation of the lower auger portion 112 with respect to the vertical axis (e.g., the first angle θ) and the upper auger portion 114 (e.g., the second angle δ) increases the overall front reach and the side reach of the auger assembly 110. For example, as shown in FIG. 1, when the upper auger portion 114 is set in the operating position, the auger assembly 110 extends beyond the hitch 106 in the first direction (e.g., direction of travel) such that the discharge portion 120 is positioned ahead of the tongue 108 and coupler 109 by a distance labeled "B". In some embodiments, "B" is greater than zero, and may be, for example, be range from about 8 inches to 24 inches. In one non-limiting embodiment, the discharge 120 is positioned ahead of the tongue 108 by about 19¾ inches. Such values of "B" provide for an improved operator view of auger assembly (such as during an unloading operation), which improves the operation of the farm implement. As shown in FIG. 1, when the upper auger portion 114 is set in the operating position, the discharge portion 120 has a height measured from the ground or bottom of track 104 labeled "A". In some embodiments, the height "A" may range, for example, from about 10 feet to 15 feet. In one non-limiting embodiment, the height "A" may reach about 12 feet, 7 inches.

Side reach may be increased, for example, based on the values of the first and second angles indicated above. If the upper auger transport position forward angle (the combination of the first and second angles) relative to a vertical plane is greater when the auger is in the unloading position than in the transport position, the side reach will be increased.

Compared to a typical double auger configuration where the lower and upper vertical auger sections are inline and their centerlines are parallel to the container vertical front panel, embodiments of the present disclosure, such as the embodiment shown in FIGS. 1-4, improve the forward reach and side reach of the auger assembly 110. For example, in some common sizes of farm implement, the forward reach may be improved by 110 inches, putting the discharge opening center about two feet ahead of the hitch point to provide a better operator view.

Thus, a number of embodiments have been fully described above with reference to the drawing figures. Other details of the embodiments of the invention should be readily apparent to one skilled in the art from the drawings. Although the invention has been described based upon these embodiments, it would be apparent to those skilled in the art that certain modifications, variations, and alternative constructions would be apparent, while remaining within the spirit and scope of the invention. For example, a gear box with a pair of beveled gears or a double U-joint could be used as a coupling for the upper and lower auger portions instead of a single U-joint. Furthermore, if desired, the lower auger portion can be a turbo auger as disclosed in U.S. patent application Ser. No. 12/192,821, titled "Improved Auger for a Farm implement," filed on Aug. 16, 2007, the entire contents of which are incorporated herein by reference. Additionally, while the farm implement has been shown and described with tracks, it will be appreciated by those skilled in the art that the folder auger of the present invention can be utilized in a cart having two wheels on a single axle, or in a cart having walking-tandem dual wheels, steerable tandem axles and other wheel arrangements. These and other modifications of the present invention are intended to be within the scope of the appended claims.

What is claimed is:

1. A farm implement comprising:
   a frame;
   a container mounted on the frame and comprising a front wall, a rear wall, and laterally opposed side walls arranged such that the container defines a space for holding grain;
   a hitch extending away from the front wall in a first direction; and
   an auger assembly extending away from the front wall and configured to receive grain held in the container and convey the grain out of the container, wherein the auger assembly comprises:
   a receiving auger portion disposed proximate to the front wall;
   a lower auger portion comprising a lower auger housing extending along a longitudinal axis of the lower auger portion from a first end to a second end, wherein the first end of the lower auger housing is operatively connected to the receiving auger portion;
   an upper auger portion comprising an upper auger housing extending along a longitudinal axis of the upper auger portion from a first end to a second end;
   a joint assembly coupled to the upper and lower auger portions and defining a folding axis, wherein the upper auger portion is configured to pivot about the folding axis between a transport position and an operating position such that the first end of the upper auger housing abuts the second end of the lower auger housing in the operating position, and the first end of the upper auger housing is spatially separated from the second end of the lower auger housing in the transport position; and
   a discharge portion coupled to the second end of the upper auger housing;
   wherein the lower auger portion is angled toward the hitch relative to a vertical plane extending transverse to a direction of travel by the farm implement such that a centerline of the lower auger portion is oriented at a first angle relative to the vertical plane;
   wherein the lower auger portion is angularly offset from the upper auger portion such that the centerline of the lower auger portion is oriented at a second angle relative to a centerline of the upper auger portion.

2. The farm implement of claim 1, wherein the first angle ranges from about 5° to about 25°.

3. The farm implement of claim 1, wherein the first angle is set at about 12°.

4. The farm implement of claim 1, wherein the second angle ranges from about 10° to about 30°.

5. The farm implement of claim 1, wherein the second angle is set at about 17.5°.

6. The farm implement of claim 1, wherein the auger receiving portion is disposed at about a center position along a bottom edge of the front wall.

7. The farm implement of claim 1, wherein the hitch comprises a tongue and a coupler disposed at an end thereof, and when the upper auger portion is set in the operating position, the auger assembly extends beyond the hitch in the first direction such that the discharge portion is disposed ahead of the tongue and the coupler by a first predetermined distance.

8. The farm implement of claim 7, wherein the first predetermined distance is set from about 8 inches to 24 inches.

9. The farm implement of claim 7, wherein the auger receiving portion is aligned with the coupler of the hitch.

10. The farm implement of claim 1, wherein auger assembly further comprises a pivot member integrated with the lower auger portion, and the pivot member is configured to rotate about a rotational axis extending transverse to the vertical plane such that the auger assembly pivots between a plurality of operating positions.

11. The farm implement of claim 10, wherein a height between the discharge portion and a ground surface changes as the auger assembly pivots between the plurality of operating positions.

12. The farm implement of claim 11, wherein the height between the discharge portion and the ground surface ranges from about 10 feet to 20 feet.

13. The farm implement of claim 10, wherein a side reach between the discharge portion and the rotational axis changes as the auger assembly pivots between the plurality of operating positions.

14. The farm implement of claim 13, wherein the side reach between the discharge portion and the rotation axis ranges from about 5 feet to about 15 feet.

15. The farm implement of claim 10, wherein the vertical plane extends through the pivot member.

16. The farm implement of claim 1, wherein the upper auger housing extends along the front wall in a lateral direction when the upper auger portion is set in the transport position.

17. The farm implement of claim 1, wherein the centerline of the lower auger portion is defined by the longitudinal axis of lower auger portion or is parallel to the longitudinal axis of the lower auger portion, and the centerline of the upper auger portion is defined by the longitudinal axis of upper auger portion or is parallel to the longitudinal axis of the upper auger portion.

18. The farm implement of claim 1, wherein the second angle corresponds to a forward component of the angular offset between the upper and lower auger portions such that an angular displacement between the upper and the lower auger portions, as defined by the second angle, extends in the first direction toward the hitch.

* * * * *